United States Patent

[11] 3,582,941

[72] Inventors Alain Yves Le Maout
Creteil;
Claude P. Lerouge, Montgeron, both of, France

[21] Appl. No. 686,072
[22] Filed Nov. 28, 1967
[45] Patented June 1, 1971
[73] Assignee International Standard Electric Corporation
[32] Priority Nov. 28, 1966
[33] France
[31] 85235

[54] NONLINEAR DECODER
5 Claims, 4 Drawing Figs.

[52] U.S. Cl. .......... 340/347
[51] Int. Cl. .......... H03k 13/04
[50] Field of Search .......... 340/347

[56] References Cited

UNITED STATES PATENTS

| | | | |
|---|---|---|---|
| 3,277,464 | 10/1966 | Naydan et al. | 340/347 |
| 3,305,857 | 2/1967 | Barber | 340/347 |
| 3,377,586 | 4/1968 | Kaneko | 340/347 |
| 3,396,380 | 8/1968 | Ohashi | 340/347 |
| 3,400,257 | 9/1968 | Smith | 340/347X |

*Primary Examiner*—Maynard R. Wilbur
*Assistant Examiner*—Gary R. Edwards
*Attorneys*—C. Cornell Remsem, Jr., Rayson P. Morris, Percy P. Lantzy, J. Warren Whitesel, Phillip A. Weiss and Delbert P. Warner

ABSTRACT: There is provided a decoder for PCM (pulse code modulated) signals previously coded in binary form from an analog signal. The most significant of seven digits is used to determine the polarity of the original signal and to determine the selection of one or the other of two sets of seven gates. The following three digits control a current generator establishing a source of current having an amplitude eight times (8I) that of the basic quantizing step (current level I). The same three digits also establish control of one of seven gates to inject the current from the current generator into a resistor ladder network. The three least significant digits are used in the control of three other current generators (at levels 4I, 2I and I) which supply additional current at the injection point to enable reproduction of the analog signal. An analog signal representing the code group may then be taken between output terminals of the two resistor ladders.

NONLINEAR DECODER

The present invention relates to apparatus for decoding a binary number number into an or analog quantity the characteristic of which is not linear and presents a discontinuous look.

Such a digital-to-analog decoder with a nonlinear characteristic can be used on the one hand as an expandor-decoder, and on the other hand as a decoder associated with a compressor-coder apparatus, the coding being performed by feedback-comparison.

It will be remembered that a feedback-comparison coder consists of apparatus for comparing the analogic value representative of a number written in a register to the signal to be coded in order to decide whether the number is too large or too small. In the first case, the number is reduced, in the second one, it is increased. These comparing operations are pursued until the compound voltages are not more different than the value of a quantizing step.

When the used decoder is a nonlinear one, coding is carried out according to a nonlinear characteristic curve. The same decoder can be used for coding and decoding; the compression and expansion characteristics are then perfectly complementary if this decoder has permanent and reproductible characteristics.

Nonlinear decoders using a resistor network are known and they permit the attainment of a hyperbolic characteristic. These resistors, the extreme values of which are in a $2^n$ ratio, must be switched according to the value of the number to be coded. Now, it is known that every resistor has some reactance which is a function of its value. If the switching frequency is high, the effect of this reactance becomes important and the corresponding compound impedance value depends on the number to be coded. It is therefore understood that a decoder, comprises resistors, the value of which are so dissimilar, is difficult to achieve and cannot provide great precision.

Moreover, when an electronic switch is used to sample the signal to be coded, the said switch provides, when it is open, a series resistance (saturation resistance in the case of a transistor) which is not negligible with regard to the network resistances of low value and which introduces a new error source.

To lessen the difficulties in obtaining a continuous nonlinear characteristic, there has been provided as described in the French Pat. No. 1,357,668, a decoder which operates in such a way that its characteristic curve is produced by a succession of straight-line segments with different slopes, these slopes being chosen, for example, so that they are approximately tangential to a logarithmic curve.

The functioning of this decoder will be understood, in a concise way, by supposing that the numbers or codes which are applied to it comprise $n$=7 digits, and that the voltages corresponding to codes zero and $2^n-1$ are respectively equal to zero and E$d$, the codes $2^{n-1}-1$ and $2^{n-1}$ being situated on both sides of the voltage E $d$/2 which characterizes the average value of the signal in the case when the codes represent periodical voltages. Each one of these voltage ranges of E $d$/ 2 amplitude is divided into three coding zones C1, C2, C3 to which, respectively, correspond 32, 16 and 16 codes and in which the values of the quantizing steps are different. So, in the C1 zone, that corresponds to the lowest voltages in absolute value, on both sides of the origin, the value of this step is equal to V. In the C2 zone, it is equal to 8V and in the C3 zone, it is equal to 64V. A characteristic curve compounded of six segments, the slopes of which are proportional to the different values of the quantizing steps, is thus determined.

To obtain the analogic voltage corresponding to a given code, the zone to which it belongs is first determined, this operation being easily performed by decoding its three most significant digits, since each zone comprises a number of codes equal to an integer power of two. The signal of zone thus obtained is used on the one hand to elaborate a base or pedestal voltage equal to the voltage which corresponds to the maximum code of the immediately preceding zone, and on the other hand to elaborate a complementary voltage representing the position of the code in the zone to which it belongs; this voltage being obtained by decoding in a linear way the least significant digits with weighting corresponding to the value of the quantizing step in the said zone. These two voltages are then added up to obtain the analogic voltage corresponding to the code.

In a transmission system using this circuit for feedback comparison coding and for decoding, a considerable increase in the distortion level is noticed at the junction point of the contiguous zones. It is obvious that the distortion peaks are all the more important as the ratio between two consecutive slopes of the compression curve is greater, i.e. the number of zones is smaller.

To make a complete use of the compression, it is therefore needfull to "smooth" the characteristic of the said compression, i.e, to increase the number of slopes. In the French Patent No. 1,460,676 a nonlinear decoder for binary numbers of $n$=7 digits, presenting a discontinuous characteristic with seven slopes has been described. These seven slopes define seven coding zones C1, C2, C3, C4, C5, C6 and C7 on both sides of the average voltage E$d$/2, the C1 zone being the zone which corresponds to the lowest voltages, in absolute value, on both sides of the average voltage E$d$/ 2. This C1 zone comprises 16 codes to which are assigned 16 quantizing unit steps, i.e. one step by code; each following zone C2 to C7 comprises eight codes with values of the quantizing steps respectively equal to two, four, eight, 16, 32, 64 quantizing unit steps. The analogic voltage corresponding to a given code is obtained by elaborating a pedestal voltage characterizing the amplitude of the analogic voltage corresponding to the totality of the zones inferior to the zone to which belongs the code by the investigation of its three or four most significant digits; a complementary voltage is then elaborated, representing the decoded value of the difference number between the given code and the maximum code of the immediately inferior zone, by using the value of the quantizing step affected to the zone to which belongs the code; the pedestal and complementary voltages are then added. These pedestal and complementary voltages are obtained by making one or several current generators simultaneously deliver at different injection points of a ladder attenuator introducing a loss of two per cell, the injection points being chosen with regard to the zones to which the code belongs.

Such a decoder presents the drawback of entailing an important number of current generators the control signals of which are elaborated by circuits comprising a great many logic circuits.

A primary object of the present invention is to realize a nonlinear decoder having a discontinuous characteristic which does not present the above mentioned drawback.

According to a feature of the present invention, a decoder for binary numbers comprising $n$=7 digits, the most significant of which characterizes a positive or negative voltage according as it is equal to 1 or to 0, the other digits characterizing the amplitude of the voltage measured on both sides of the zero voltage so that the code comprising $n$ digits 1 corresponds to the maximum positive amplitude, and the code comprising one digit 0 and six digits 1 corresponds to the maximum negative amplitude, has a characteristic curve that is symmetrical with regard to the zero abscissa point, each part of the said curve presenting seven segments, the slopes of two consecutive segments being in a ratio two; this decoder mainly comprises a register recording the code to be decoded, two identical ladder networks with seven cells, each one introducing a loss of two, current generators which supply the two ladder networks, and which are controlled by the signals corresponding to the digits of the code set in the register, electronic gates disposed between the current generators and the ladder networks and controlled by the signals supplied by a binary-decimal decoder decoding the four most significant digits of the code, that allow to choose the injection point, in the ladder network, of the current delivered by the generators; the decoded voltage is taken between the two output terminals of the ladder networks.

According to another feature of the present invention, it is provided for an additional current generator continually delivering a constant current equal to the half of the current delivered by the current generator controlled by the least significant digit of the code.

The above mentioned and other features and objects of this invention will become apparent by reference to the following description taken in conjunction with the accompanying drawings, in which.

When one intends to compress a low frequency signal, such as a speech signal, with a constant signal-to-noise ratio in the whole amplitude range of the signals to be compressed, a logarithmic compression law defined by the equation $$y=1+\frac{\log x}{\log k}$$

is chosen. In this equation in which the two logarithms are expressed in the same base, $x$ is the ratio of the amplitude of signal to be compressed to the maximum positive amplitude admitted at the input of the compressor, $y$ is the homologous ratio for the compressed signal and $k$ is the compression parameter. The graphic representation of such a law, if $k$ is taken equal to 10, is given by the curve R of FIG. 1, in which the variable $x$ is counted on the abscissa axis MX, the variable $y$ being counted on the ordinate axis MY. This curve R is only available for the positive signals, so it must be completed, for the negative signals, by a curve R', symmetrical to the curve R with respect to the origin M. These two curves R and R' do not connect, and thus there is a discontinuity which is embarrassing when it is wanted to compress signals corresponding to absolute values of $x$ inferior to $\frac{1}{k}$ which is the abscissa of the intersection point P (or P') between the curve R (or R') and the abscissa axis. To overcome this drawback, one of the solutions consists in setting in this zone a linear correlation between the value of $x$ and the value of $y$.

Figure 1:
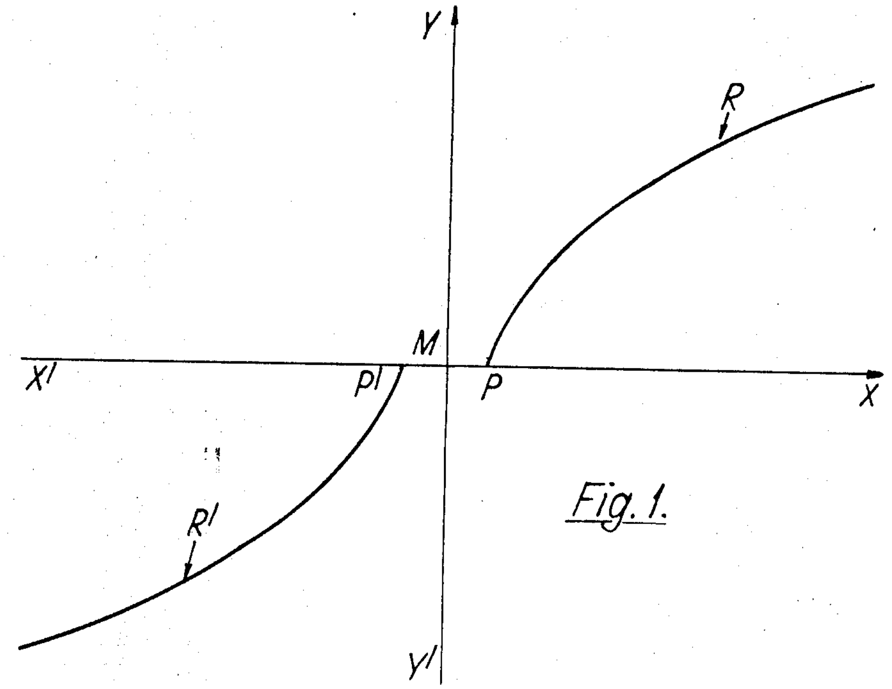
FIG. 1 represents a logarithmic compression curve.

One can imagine nonlinear coding circuits in which the compressing and coding operations are independent and carried out in succession. However, in most of the circuits described in the specialized literature relative to this technique, these two operations are done simultaneously by incorporating the compression operation into the coding one. In FIG. 1, this comes to graduate directly the ordinate axis MY according to chosen codes, the graduations being equally spaced.

Practically, such a continuous logarithmic characteristic is difficult to realize, so the said law is approximated to the segments that subtend the arcs of the curve, the ends of the said segments having their ordinates equally spaced. Moreover, the number of ends will be, in preference, an integer power of two, so that the corresponding code at the intersection of two segments corresponds, as will be seen further on, to a partial economic decoding. By an effect of the logarithmic law, the abscissae of the two particular next points will be in the same ratio, the said ratio being equal to an integer number if the compression parameter $k$ is also a power of two.

Figure 2:
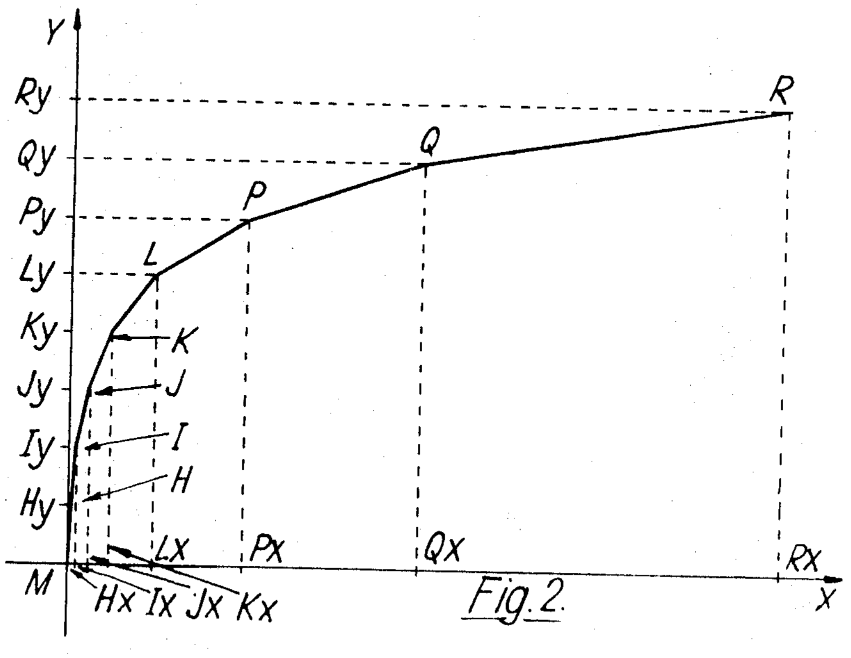
FIG. 2 represents an approached logarithmic compression curve, limited to the positive signals.

One often chooses $k$=256 and the equation of the compression curve is then written:

$$y=1+\frac{\log_2 x}{8};$$

eight points (FIG. 2) $Hy$, $Iy$, $Jy$, $Ky$, $Ly$, $Py$, $Qy$ and $Ry$ with respective ordinates 1/8, 2/8, 3/8, 4/8, 5/8, 6/8, 7/8 and 1 are chosen on the axis MY, to these points correspond eight points $Hx$, $Ix$, $Jx$, $Kx$, $Lx$, $Px$, $Qx$ and $Rx$ on the axis MX, with respective abscissae 1/128, 1/64, 1/32, 1/16, 1/8, 1/4, 1/2 and 1, the said values having been determined by the preceding equation. These are the coordinates of eight points H, I, J, K, L, P, Q and R of the logarithmic curve that are connected together and to the origin M by straight line segments, in order to obtain the curve represented in FIG. 2. The approached characteristic curve for the negative signals is obtained symmetrically with regard to the origin M and it is obtained the points H', I', J', K', L', P', Q' and R'. The whole characteristic curve is given by FIG. 3. This curve comprises 13 segments and it is easy to show that the slopes of two consecutive segments are in a ratio two. It can also be shown that the segment MH which connects the origin M to the first point of the logarithmic curve has the same slope as the one of the segment HI and is thus aligned with this one.

Figure 3:
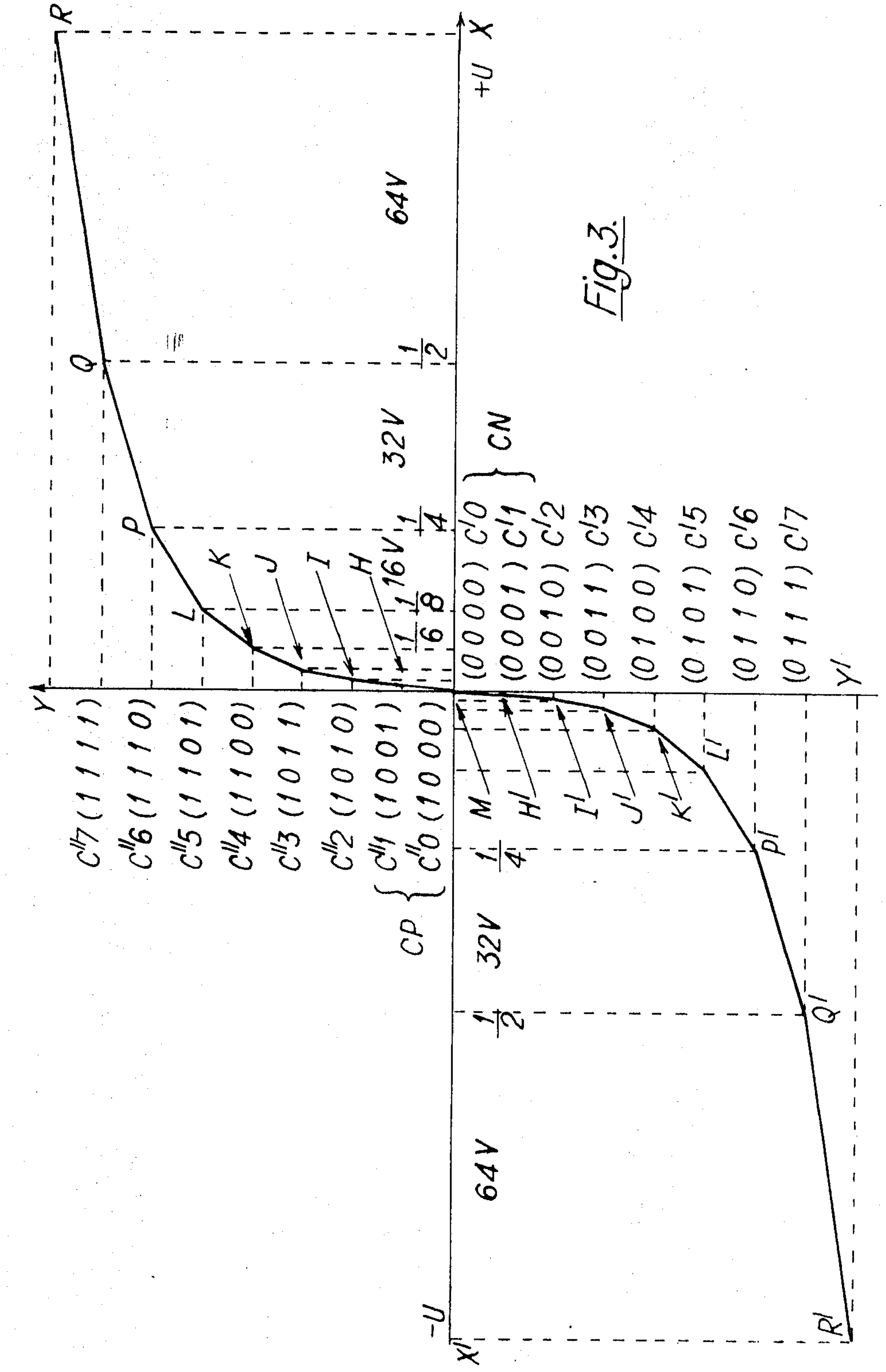
FIG. 3 represents the characteristic curve of the decoder according to the invention.

In order that such a characteristic compression curve becomes a characteristic of codage with compression, it is sufficient to graduate the ordinate axis with codes, the number of digits of the code depending on on the precision of the codage which is wanted to be obtained. In the considered particular example, the codes have $n$=7 digits, which corresponds to 128 equal levels on the ordinate axis. In the coding circuit to which the decoder, object of the present invention, is particularly destined, one will code, according to the normal binary scale, the sample amplitudes on each side of the level corresponding to the amplitude zero signal, by assigning the first digit of the code to the polarity of the sample: a digit 1 for a positive sample and a digit 0 for a negative one. In such a coding process, called symmetrical coding, the code 1111111 is assigned to the maximum positive amplitude +U and the code 0111111 is assigned to the maximum negative amplitude −U. It will be noticed that the codes of the levels corresponding on one hand to the points H, I, J, K, L, P, Q and R and on the other hand to the points H', I', J', K', L', P', Q' and R' are easy to detect by decoding the four most significant digits of the code, the three other digits being zeros. FIG. 3 sums up the correspondences existing between the different particular points of the characteristic curve, and their coordinates. Thus, it has been represented, in parentheses, on the ordinates axis Y'MY, the codes formed with the four most significant digits and, on the abscissae axis X'MX, the corresponding fractions of the absolute value of the maximum voltage U. Each one of these four digits codes defines a coding zone, the different coding zones having been referenced C'0 to C'7 for the zones concerning the negative amplitudes, and C''0 to C''7 for the zones concerning the positive amplitudes. It will be noticed that in fact the coding zones C'0 and C'1 constitute a single coding zone, since the corresponding segments are aligned; said zone will be referenced CN. So is it with the codage zones C''0 and C''1 which will correspond to the zone CP. It has also been represented between the return lines parallel to the ordinate axis, the amplitude of the voltage corresponding to a code of the zone, i.e. by definition the value of the quantizing step in this zone. The value of this step is measured by taking as unit value V of the quantizing step in the central zone CN or CP.

As has been said previously, the coding operation therefore consists in connecting a code to a voltage, the said connection being defined by a certain law which, in the particular case described, is an approached logarithmic law represented by FIG. 3. Inversely, the decoding operation consists in converting a voltage to a code, by using the same characteristic curve of FIG. 3.

Figure 4:
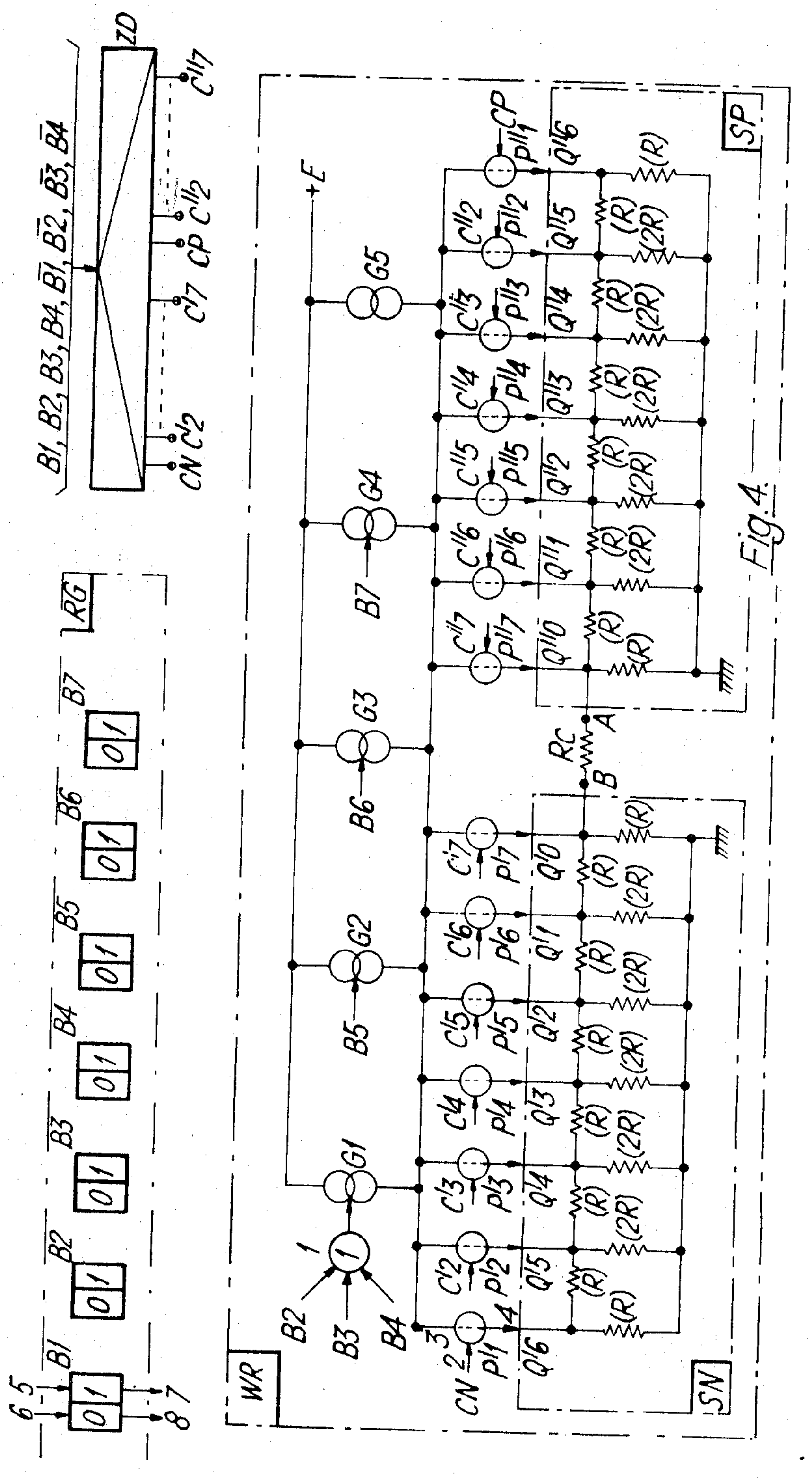
FIG. 4 represents the detailed plan of this decoder.

FIG. 4 represents a particular example of achievement of a decoder according to features of the present invention. In this FIG. 4, the symbol bearing the reference 1 comprising a digit 1 surrounded by a circle designates a mixing electronic gate, called OR circuit, that supplies a positive signal on its output when a positive signal is applied on one at least of the inputs represented by arrows touching the circle. If C and D designate the signals which are present on each one of the two inputs, this circuit achieves the logical condition noted C+D.

A symbol such as the one referenced P′1 represents an electronic gate which, when controlled by a signal CN applied on its input 2, permits to transmit the amplitude of the signal applied on its main input 3 on the output conductor 4.

A symbol such as the one referenced B1 designates a flip-flop to which a control signal is applied on one of its inputs 5 or 6, in order to set it respectively into the 1 state or into the 0 state. A voltage of the same polarity as the control signals is present either on the output 7, when the flip-flop is in the 1 state, or on the output 8 when it is in the 0 state. The logical condition characterizing the fact that the flip-flop is in the 1 state will be written B1 and that characterizing the fact it is in the 0 state will be written $\overline{B1}$.

The symbol referenced RG designates a register comprising seven flip-flops previously defined and referenced B1 to B7; these flip-flops are assigned to different digits of the code, the most significant digit being that stored by the flip-flop B1. In the continuation of the description, the different digits of the code stored by the flip-flops B1, B2, B3, B4, B5, B6 and B7 will be respectively called *b1, b2, b3, b4, b5, b6* and *b7*.

A symbol such as the one referenced ZD represents a decoding circuit which, in the case of the example, transforms a four-digit-binary code applied by the group of eight conductors coming out of the flip-flops B1, B2, B3 and B4 of the register RG into a code of the type "one out of 16" which means that a positive signal appears on only one among the 16 output conductors C′0 to C′7 and C″0 to C″7 for each number displayed by the flip-flops B1, B2, B3 and B4 of the register RG. In the described example, the output conductors C′0 and C′1 are connected together and constitute a single conductor CN; so is it with the conductors C″0 and C″1 which constitute the conductor CP. These conductors bear the same reference as the codes to which they correspond.

A symbol such as the one referenced G4 represents a current generator which delivers a constant current of amplitude I in an impedance the value of which is very small with respect to the internal impedance of the said generator. This generator is started by the application of a control signal B7 corresponding to the 1 state of the flip-flop B7.

In FIG. 4, the decoder, according to the invention, comprises register RG including the flip-flops B1 to B7 for recording of codes with $n=7$ digits, the zone decoder ZD and the weighting and summation circuit WR which supplies, between the A and B terminals, a voltage characterizing the value of the code stored in the register RG.

The weighting and summation circuit WR comprises two ladder attenuators SN and SP connected to current generators G1 to G5 through electronic gates P′1 to P′7 for ladder attenuator SN, and through electronic gates P″1 to P″7 for ladder attenuator SP. The functioning of these ladder attenuators has been described in the above mentioned French Pat. No. 1,357,668.

The extreme shunt resistors of these attenuators having a value R, it results that, by choosing values 2R and R, respectively, for the other shunt resistors and serial resistors, attenuators are obtained with a characteristic impedance $\frac{2R}{3}$ giving an attenuation equal to two per cell. It results that, if a current I is injected at the point Q′0 of ladder network SN, a voltage $$V_B=\frac{2RI}{3}$$

appears between point B and the earth, and if the injection point is displaced on the left of the figure, voltage $V_B$ decreases each time in a ration two. It is thus seen that attenuation ratio is a negative power of two, the exponent of which is given by the reference digit at the point of injection. Thus, a current injected at point Q′2 generates a voltage attenuated in a ratio $$2^{-2}=\frac{1}{4}$$

with respect to the same current injected at point Q′0.

Moreover, if there is injected, at a given point, currents supplied by two generators having a high internal resistance with respect to the characteristic impedance of the network, there is addition of currents. In the case of the FIG. 4, current generators G1 to G5 respectively supply currents 8I, 4I, 2I, I and I/2.

The decoding is preferred in the following way: for a given code stored in register RG, decoding of the four most significant digits given by the flip-flops B1 to B4 activates one of the output conductors CN, C′2...C′7, CP, C″2...C″7 of zone decoder ZD. The output signal of decoder ZD opens either one of the electronic gates P′1 to P′7 associated to the network SN when the most significant digit is a 0 (negative amplitude) or one of the electronic gates P″1 to P″7 associated to network SP when the most significant digit is a 1 (positive amplitude). The opening of one of these 14 electronic gates allows the current generators G1 to G5 to deliver current at a given point of one of the two networks, the opening of a certain number of generators having been directly controlled by the signals of the flip-flops of the register RG. The decoded voltage is the voltage appearing on a charge resistor Rc disposed between the output points A and B of the ladder networks, for example the voltage $V_A-V_B$.

Although the control operations of the current generators G1 to G4 and of the electronic gates P′1 to P′7 and P″1 to P″7 are done simultaneously, two periods can be distinguished for convenience in the explanation: first the elaboration of a pedestal voltage, then the elaboration of a complementary voltage.

The pedestal voltage corresponds to a value in the lower part of the zone in which the code is stored by the register RG. But this zone is first defined by the most significant digit *b1* of the code which determines the higher (positive) or lower (negative) part of the characteristic curve in which the code is, which allows to choose one or another of the ladder networks. The three following digits *b2, b3* and *b4* then determine the coding zone among the seven zones of each part of the characteristic curve, which allows to choose the injection point of the current supplied by the current generator G1 opened, through the OR circuit 1 when one of the digits *b2, b3* and *b4* is a 1. These two choices are made by a zone decoder ZD which decodes the four most significant digits of the code, and elaborates a signal that opens one out of the 14 electronic gates controlling the flow of the current between the current generators and the ladder networks. The current 8I, supplied by the generator G1, is attenuated to a larger or lesser degree, according to the point of injection in the ladder network, and a voltage $V_A-V_B$ characteristic of the zone appears between the points A and B.

To this pedestal voltage is added a complementary voltage obtained by opening the current generators G2, G3 and G4, respectively which supply currents 4I, 2I and I. The opening of these generators G2, G3 and G4 is directly controlled by the least significant digits of the code, namely the digits stored by the flip-flops B5, B6 and B7. These different currents are added up to the current from the generator G1 and are injected at the same point of the ladder network. The utilization of a single point of injection, for the elaboration of the pedestal voltage and of the complementary voltage, can be explained by noticing that, when passing from a coding zone to the immediately superior one, the pedestal voltage doubles, and so does the quantizing step. The number of quantizing steps to add to the pedestal voltage is given by the sum of the currents supplied by the generators G2, G3 and G4, the currents of the said generators being in the ratio of the binary weights of the signals that control them.

It will be noticed that if the generators G1 to G4 were only used, the code 1000000 corresponding to a positive amplitude, and the code 0000000 corresponding to a negative amplitude would give rise to no decoded voltage between the points A and B. To overcome this drawback, a current generator G5 is used which continually supplies a constant current with a value I/2, so that the decoding of the code 1000000 supplies a positive voltage equal to half-a-quantizing step. This half-a-quantizing step is found again in all the coding zones, with the value assigned to this coding zone. Consequently, it results that the decoded voltage is set half way from the extreme limits of the zone assigned to a given code, and so the decoding error is equal to half-a-quantizing step.

While the principles of the above invention have been described in connection with specific embodiments and particular modifications thereof, it is to be clearly understood that this description is made by way of example and not as a limitation on the scope of the invention.

What we claim is:

1. A nonlinear decoder for converting binary signals into analog form where the binary signals include a total of $n$ digits incorporating a smaller group of $x$ digits, the most significant one of the $n$ digits characterizing whether the analog signal is to be negative or positive, each of the $(n-X-1)$ digits succeeding the first digit characterizing the level of a pedestal voltage, and the least significant and remaining $x$ digits characterizing a supplementary voltage representing the difference between the encoded analog voltage and the pedestal voltage, said decoder comprising:

a register recording the $n$ digits of code to be decoded, two identical ladder networks formed of resistors, a first current generator responsive to signals representing one of the $(n-x-1)$ digits following the first digit recorded in the register, said first current generator responding to said signals to supply current to the ladder network at a level to establish a pedestal voltage, additional current generators responsive to signals representing the last $x$ digits and coupled to provide additional current to the ladder network to complete the reproduction of the analog signal, a zone decoder for providing control signals to establish zones characterized by a minimum voltage level, said zone decoder responding to the first digit to determine the polarity of succeeding digits and to direct said control signals to one of the two ladder networks accordingly, and gating means responsive to the control signals to control the application of said first current and said additional current to one of said ladder networks.

2. A nonlinear decoder as claimed in claim 1, in which $n$ represents 7, 7 group of resistors are located in each of the ladder networks, and the gating means includes 7 electronic gates to control current delivered to the cells.

3. A nonlinear decoder as claimed in claim 1, in which a resistor is connected between output terminals of the two ladder networks, and said resistor bears the decoded input voltage across its terminals.

4. A nonlinear decoder as claimed in claim 1, in which the additional current generators include three generators controlled by the least significant digits of code, and a fifth generator is supplied to continually make available a constant current equal to one-half the current required from an additional current generator controlled by the least significant digit of the code.

5. A nonlinear decoder as claimed in claim 4, in which the four generators operate in pairs to supply quantized signals in which the quantization ratio is two between adjacent signals.